US00RE40756E

(19) United States
(12) Reissued Patent
Hall

(10) Patent Number: US RE40,756 E
(45) Date of Reissued Patent: Jun. 23, 2009

(54) BAG CLAMP

(76) Inventor: Christopher I. Hall, 477 NW. State St., Bend, OR (US) 97701

(21) Appl. No.: 10/862,910

(22) Filed: Jun. 7, 2004

Related U.S. Patent Documents

Reissue of:
(64) Patent No.: 6,578,243
Issued: Jun. 17, 2003
Appl. No.: 10/164,341
Filed: Jun. 7, 2002

(51) Int. Cl.
*A44B 21/00* (2006.01)
*B76B 7/00* (2006.01)

(52) U.S. Cl. ..... 24/501; 24/502; 24/30.5 R; 24/543; 30/2; 30/294

(58) Field of Classification Search ..... 30/280, 30/294, 2
See application file for complete search history.

(56) References Cited

U.S. PATENT DOCUMENTS 381,265 A * 4/1888 Martens ..... 24/30.5 R
673,375 A * 5/1901 Bayha ..... 30/289
2,679,098 A * 5/1954 Deicken ..... 30/294
4,360,970 A * 11/1982 Ostroski et al. ..... 30/2
4,656,697 A * 4/1987 Naslund ..... 24/30.5 R
4,660,750 A * 4/1987 Blanchard ..... 24/501
4,711,031 A * 12/1987 Annello ..... 30/294
4,847,956 A * 7/1989 Levine ..... 24/30.5 R
5,007,171 A * 4/1991 Horning, Jr. ..... 30/294
5,117,524 A * 6/1992 Chang ..... 7/160
5,267,374 A 12/1993 Drake
5,457,858 A 10/1995 Lin
5,752,319 A * 5/1998 Su et al. ..... 30/2
5,802,677 A 9/1998 Dorman et al.
6,105,217 A 8/2000 Caradine
6,302,366 B1 10/2001 Saylor et al.
6,363,588 B1 * 4/2002 Caradine ..... 24/501

* cited by examiner

*Primary Examiner*—Jack W. Lavinder
(74) *Attorney, Agent, or Firm*—Jerry R. Potts

(57) ABSTRACT

An improved bag clamp and bag cutter is presented that is a non-obvious increase in capability over this inventor's previous bag clamp/cutter invention. The improved clamp possesses a stronger spring, an improved cutting blade with safety guard, a springboard button for pressing the blade firmly against a bag surface, and other improvements.

19 Claims, 7 Drawing Sheets

BAG CLAMP

Matter enclosed in heavy brackets [ ] appears in the original patent but forms no part of this reissue specification; matter printed in italics indicates the additions made by reissue.

BACKGROUND OF THE INVENTION

This invention relates to devices for use with bags of food, pet food, potting soil, and other bulk items. More particularly, this invention relates to devices used to close and open these types of bags.

A previous invention, U.S. Pat. No. 6,105,217, "Bag Clamp", was co-authored by this inventor, and this patent application is a set of improvements to that invention.

As covered in the cited patent application, modern polymer plastic bags are useful containers for bulk foods, bulk pet foods, and other loose, granular or small-sized items. The bags have the drawback that they are difficult to close properly once opened. They usually have smooth or slick surfaces which are difficult to grab with closure devices.

Polymer bags such as those under consideration here are often opened with the intention of closing and then re-opening then at a future time. Secure closure of the bag, to preserve product freshness for example, is necessary as is easy re-opening. Therefore, a bag closure device of this type should securely close the opened bag and be convenient to use to re-open. The previous invention by this inventor accomplished these goals by use of a strong spring to keep the device closed and by distributing the gripping force along the length of the device rather than concentrating it in the center of the device.

There are competing devices in use that also close polymer bags, but they largely fail to close and keep closed heavier bags. The competing devices tend to slip off of the bag surface easily and are much less useful.

In the cited patent, this inventor developed a device that could be made in a variety of sizes while retaining the generic characteristics of the invention. The small versions could be used for potato chip bags, popcorn bags, and the like, while the largest size would be capable of closing and re-opening larger bags of potting soil or pet food. The large device was strong enough to prevent spillage of product if a bag was knocked over, for example.

Opening polymer bags is also a problem, because they are usually tightly sealed to prevent product degradation while on store shelves. A method of quickly and predictably opening such bags is also desirable. Providing such a method prevents bag tearing, destruction of the bag, and spillage of bag contents while making bag closing and re-opening more straight-forward. The cited invention possessed features to aid consumers in opening polymer bags in an easy and safe manner, long with the above-described closure, clamping and reopening features.

INVENTION DISCLOSURE

The present invention is a set of improvements to the cited invention co-authored by this inventor. The additional features are non-obvious and confer additional, valuable, and useful capabilities to the cited invention.

In common with the cited invention, there is a clamp for closing and holding closed a polymer bag, consisting of a pair of opposed clamp members, where these clamp members can be moved from a closed *bag clamping position* to an open *bag receiving* position by pressing on them with the hand. A hinge connects the two members and holds them closed with the aid of a spring. There is a sharp blade on the inside of the "top" member held underneath a blade guard and opposite a split anvil. The blade does not extend past the guard in its rest *or guard protected* position. The blade guard rests movably on one end on a fixed rest and is fixedly attached on the other. The blade guard has a slit down its length that permits the blade to emerge when a *thin finger engagable* springboard button that it is connected to is pressed by the user gripping the bag clamp.

By pressing the button with a thumb while gripping the device, the blade is pushed through the slot in the guard and can then engage a polymer bag and cut it. When the button is not being pressed, the blade is retracted behind the guard for safety reasons.

The blade itself is improved over the previous invention, possessing increased sharpness and an improved cutting angle for maximum cutting efficiency. This is possible because of the added safety for users conferred by the blade guard.

The anvil of the previous invention is now a split anvil, with two parallel sides between which the blade fits and is guided. These changes to the previous invention are non-obvious safety improvements. The split anvil also holds bag material up to allow the blade to more easily penetrate the bag. When the blade is pressed through the guard, the guard itself is held against the split anvil, and the blade, *in an anvil protected position,* never contacts the anvil.

There are a set of ribs on the inside of each clamp member, configured so that the rib ridges on opposite sides meet when the clamp is closed. These ribs are designed to aid holding the bag when the clamp is closed. The ribs have an additional effect of stretching the bag material so that the blade can be more effective in cutting. The ribs also distribute the gripping force away from the hinge spring location.

The clip mouth ends also meet (the "lips"), and allow the bag to be drawn through the clip during the cutting process. There is in this improved invention an additional "tooth" in the middle of the bag "lips". The improved spring is now strong enough to hold larger bags than before.

BRIEF DESCRIPTION OF THE DRAWINGS

The construction and operation of the invention can be readily appreciated from inspection of the drawings that accompany this application, combined with the detailed specification to follow.

DETAILED DESCRIPTION OF THE INVENTION

Figure 2:
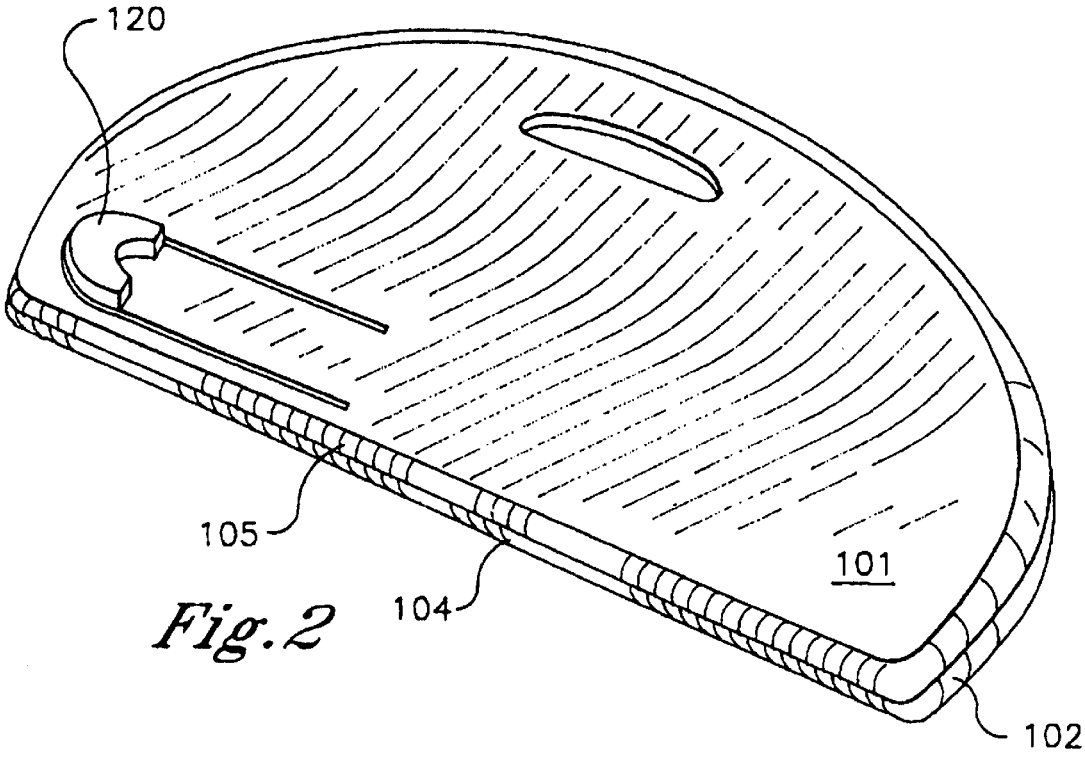
FIG. 2 is a perspective view of the invention from the top.
Figure 3:
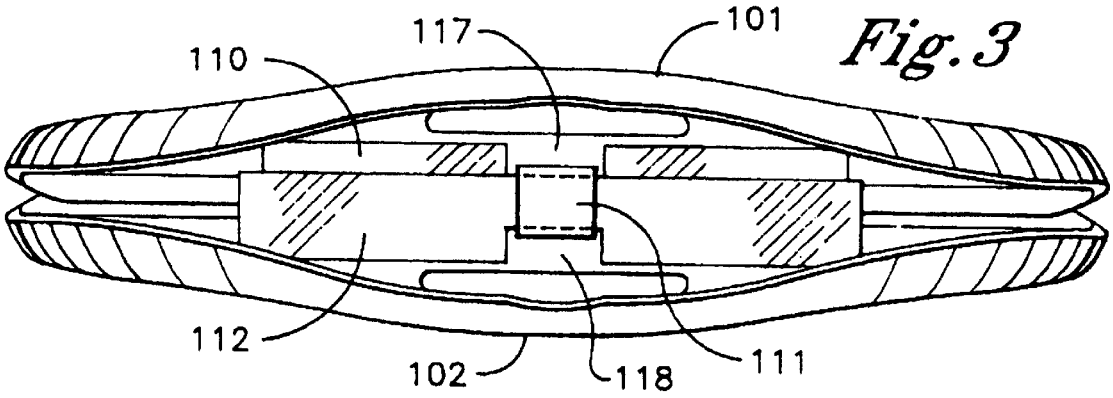
FIG. 3 is a side view of the invention from the grasping end

The present invention is an improved clamp for safely opening, clamping, and resealing polymer plastic storage bags. As shown in FIG. 2 and FIG. 3, the improved bag clamp[100] is comprised of an upper clamp member[101] and a lower clamp member[102] that are separated from each other as shown, the separation defining an opening[103] through which a polymer bag can be drawn. The upper[101] and lower[102] members each include a lip[104,105] that guides the polymer bag into the improved bag clamp opening[103].

The upper and lower clamp members each possess a leading end portion[106,107] for receiving the polymer bag. These end portions terminate in curved receptor edges[108,109]. The outer surface of each of the clamp members[101,102] is smooth.

An open box-like structure[112], having a slot[113], is disposed on the inner surface of the lower clamp member[102]. An elongated member[110], fixedly attached to the inner surface of the upper clamp member, is accepted in the slot[113] for rotational movement within the slot. As shown in FIG. 3, a spring clip[111] joins the clamp members[101,102] together and biases the mouth ends of the device together. The spring clip[111] possesses a pair of legs that are inserted through the sleeves[117,118] on the inner surfaces of the upper[101] and lower[102] clamp members.

Figure 4:
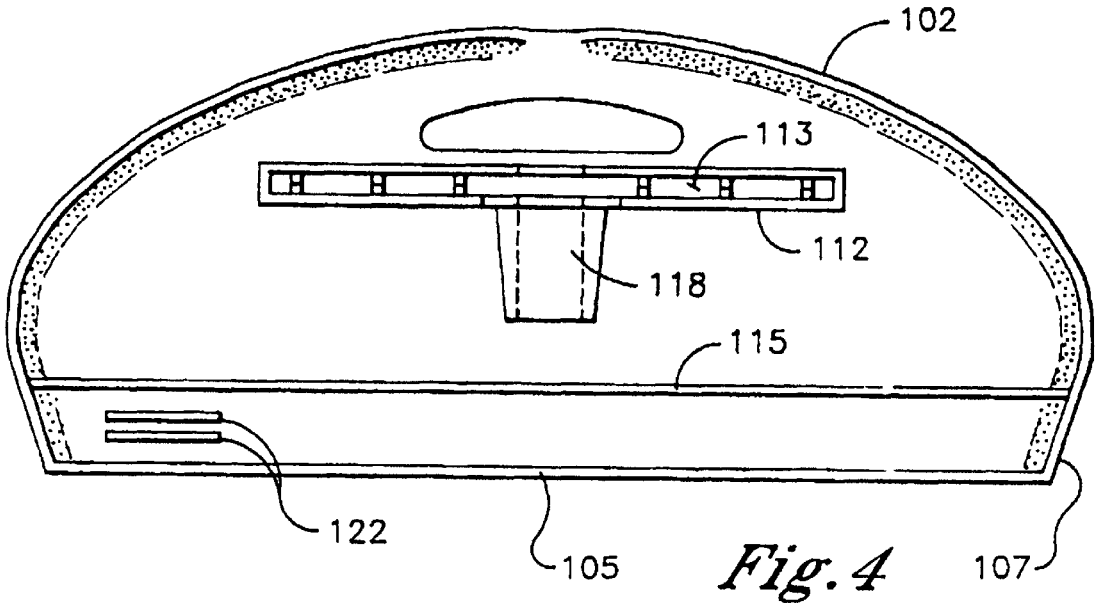
FIG. 4 is view of the inner surface of the bottom member
Figure 5:
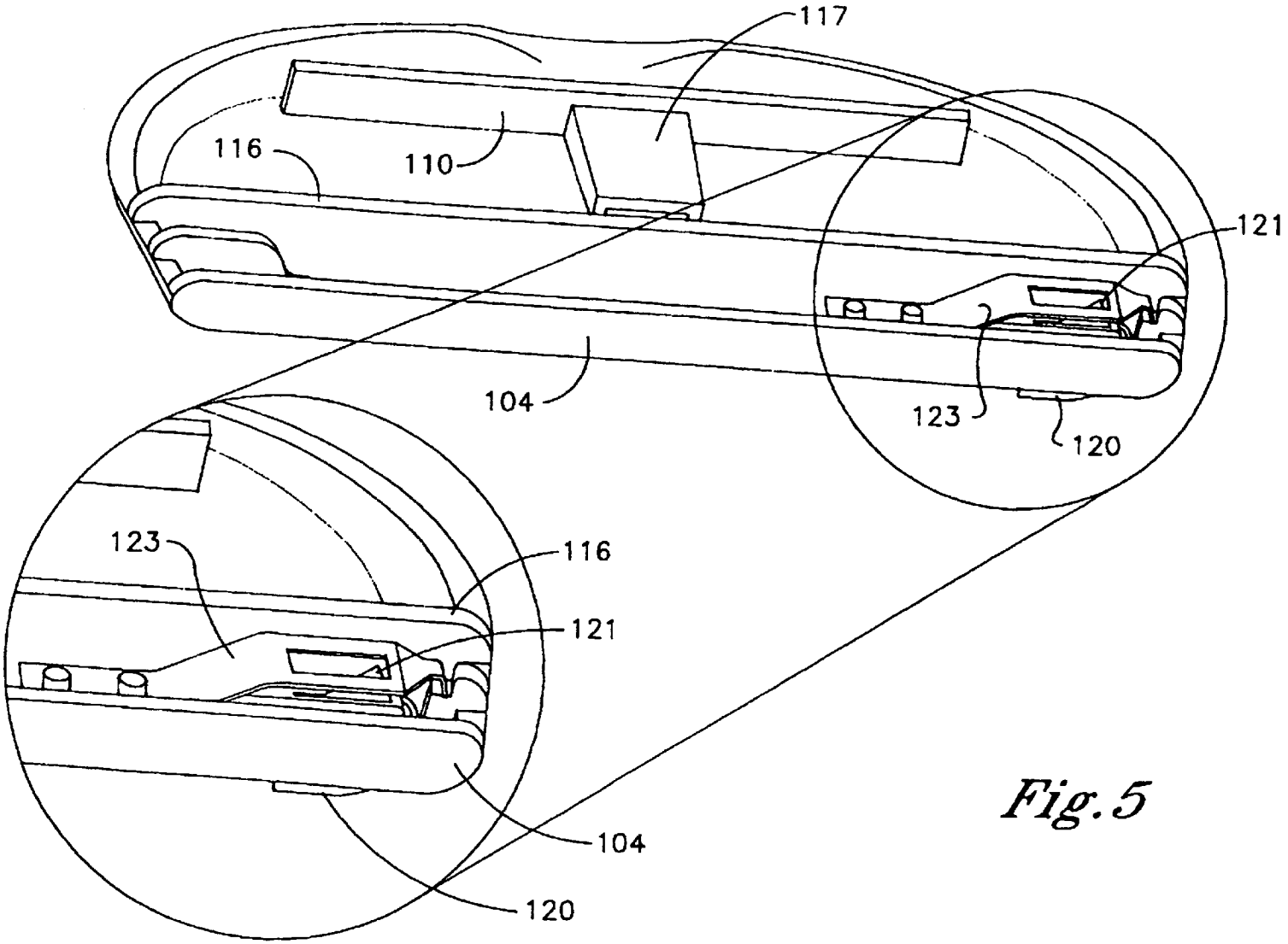
FIG. 5 is a view of the inner surface of the top member
Figure 6:
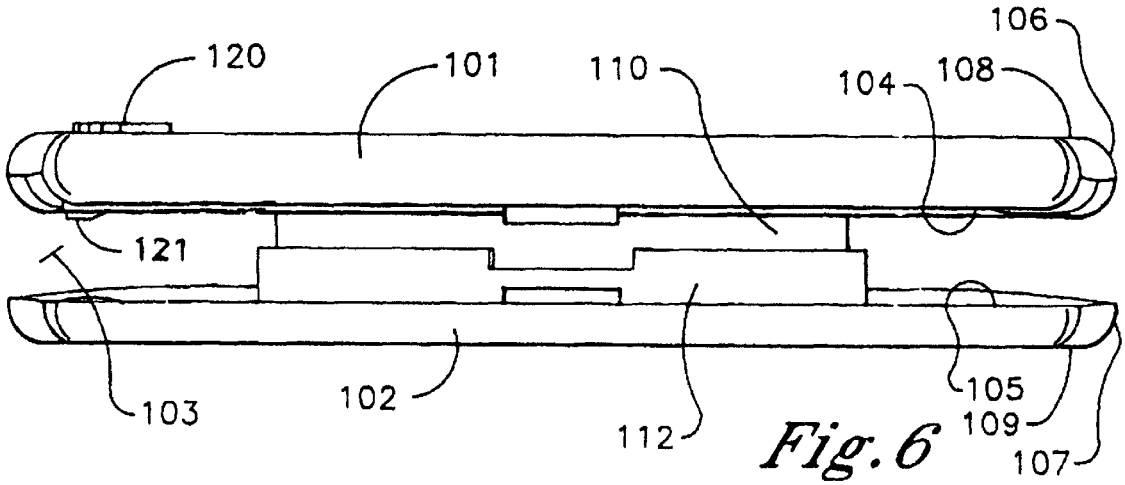
FIG. 6 is a side view of the invention looking at the mouth end with the clamp members held open
Figure 7:
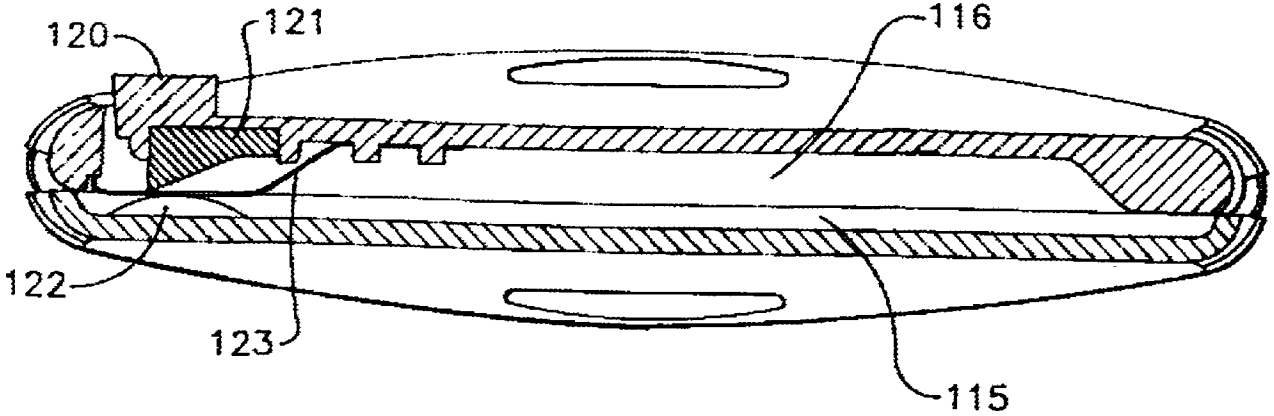
FIG. 7 is a cross-section diagram of the invention looking at the mouth end

Referring now to FIG. 4, It will be noted that on the inner surface of the "lower" clamp member[102], a raised rib[115] is placed parallel to the mouth end of the clamp member[102]. In FIG. 5, this rib is matched on the "upper" member by a similar rib[116], disposed such that when the clamp members[101,102] are biased closed by the spring clip[111], the ribs contact each other.

Figure 8:
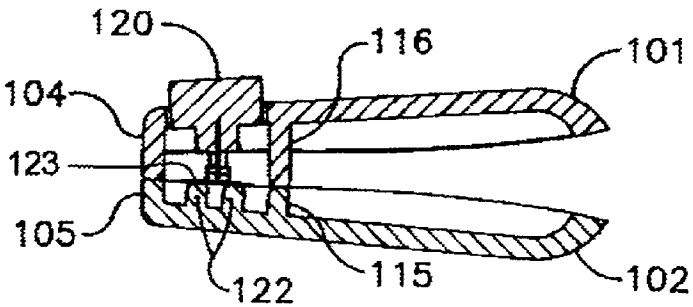
FIG. 8 is a cross section diagram of the invention looking at it from either side

Referring to FIG. 8, it can be seen that the clamp members meet at the mouth ends of the clamp members[104,105] and at the internal ribs[115,116] inside the clamp members. The spring pressure holds the polymer bag closed at these points. Note that a blade is not used to help keep a clamped bag closed, unlike in the cited invention, where a blade is continuously pressed against a flat anvil to help grip the bag.

Figure 1:
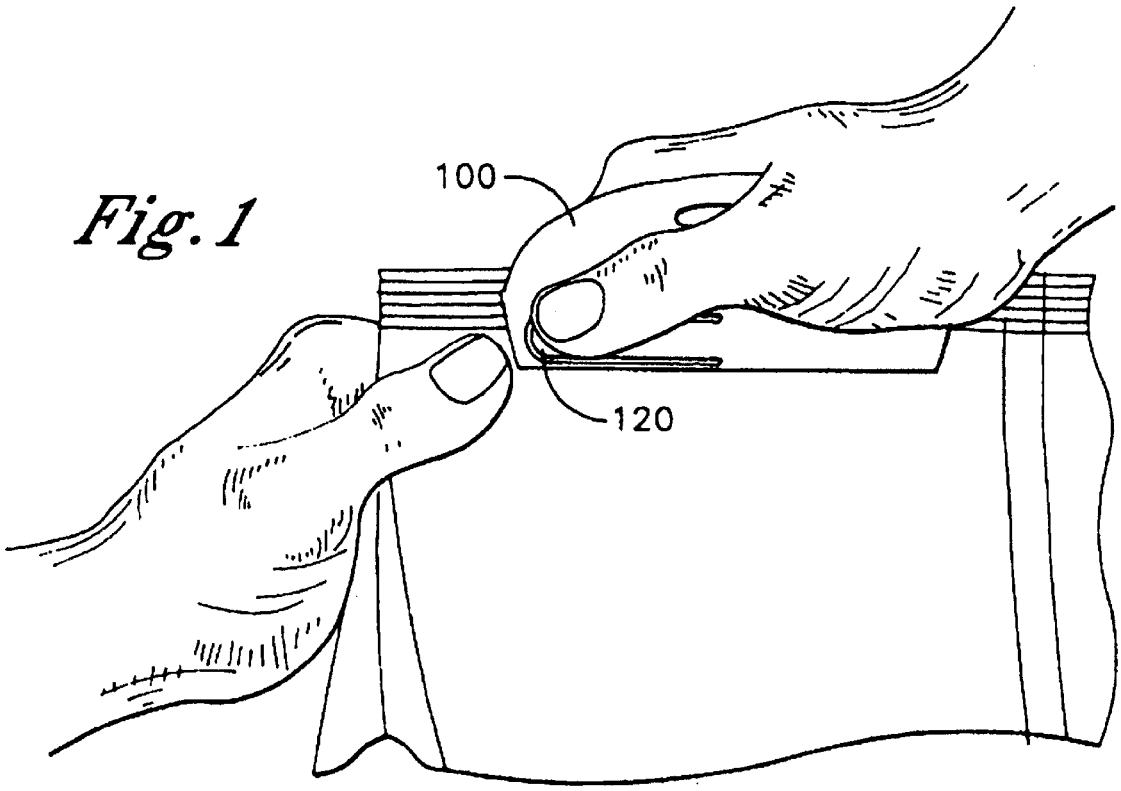
FIG. 1 is an overview drawing of the user grasping/cutting a bag with the invention.

In order to clamp the polymer bag closed, the user begins by grasping the bag with one hand as in FIG. 1. With the other hand, the user separates the clamp members[101,102] by squeezing the grasping ends of the invention and biasing the clamp[100] to an open *bag receiving* position. The user then slides the open edges of the invention until the top of the polymer bag abuts the internal structure[112]. The user then relaxes the hand pressure on the grasping ends of the invention and allows the internal spring[111] to bias the clamp to a closed *bag clamping* position. The pressure of the spring is now applied to the surface of the bag on both sides of the bag by the internal ribs[115,116] and the mouth ends of the clamp members[104,105].

The polymer bag can be released quickly from the clamp by squeezing the grasping ends of the clamp members while simultaneously removing the bag.

To slice open the polymer bag, the user grasps the clamp grasping ends and squeezes, as in the process to clamp the bag. The user then places the clamp over the bag as if to clamp it, as described above. The user then presses on the springboard button[120] to press the blade[121] *and blade guard 123 downward* into contact with the bag and push the blade through the bag, where it stops between the guides of the split anvil[122].

The leading edges of the mouth end of the clamp[106,107], the edges away from the springboard button, have a radiused corner[108,109] to help guide the clamp over seams in the polymer bag. The user then draws the clamp across the bag top in the direction of the other edge of the bag while keeping continuous pressure on the springboard button[120]. When the bag is completely open, the springboard button[120] is released and the blade retracts behind the blade guard[123] for safety.

It is evident that there are additional embodiments and applications of the improved bag clamp invention which are not disclosed in this detailed description, but which would clearly fall with the scope of said invention. This specification is intended to illustrate and clarify the nature of this invention and not limit its scope.

What is claimed is:

1. A [improved] bag clamp [for closing and cutting a polymer bag, said clamp], comprising:

two opposed clamp members, wherein said clamp members are movable between a *normally* closed *position* and [open condition, each one of] *an opened position;* said clamp members *identified respectively as an upper clamp member and a lower clamp member and each* having an inner *surface* and an outer surface[,]*;*

[a gripping means disposed on the inner surface of each one of said clamp members for gripping said bag, said gripping means including a plurality of internal ridges disposed on the inner surface of each one of said clamp members, each one of said clamp members possessing a mouth end for engagement of a bag surface and a grasping end for grasping by a user, a hinge attaching said clamp members to each other, said hinge attached to each clamp member inner surface at a location between said mouth end and said grasping end, the hinge biased by a spring clip, said spring clip possessing increased strength over spring clips in previous applications, each of said clamp member mouth ends possessing a lip for aiding in positioning said bag in said clamp, said clamp members identified as an upper clamp member and a lower clamp member,]

*a finger movable button flexibly integrally attached to said upper clamp member and having mounted thereto a cutting blade, said finger movable button facilitating the moving of said cutting blade downwardly from a retracted non-bag engaging position into an anvil protected bag cutting position;*

[a cutting means disposed on the inner surface of said upper clamp member, said cutting means comprised of a cutting blade, a springboard button, and a blade guard, said cutting blade possessing a characteristic shape and increased sharpness such that cutting efficiency is improved over previous cutting blade designs for this application,]

a split anvil [means disposed on] *integrally attached to* the inner surface of said lower clamp member[, said split anvil means] *and* disposed [in such a manner that it is] directly opposite said cutting [means] *blade* when said upper clamp member and said lower clamp member are *disposed* in [a] *said normally* closed position*;*

*said split anvil having two parallel closely spaced upstanding side walls between which said cutting blade fits and is guided to said anvil protected bag cutting position as a user moves said finger movable button flexibly downward;*

*a blade guard mounted to said finger movable button for providing said cutting blade with a protected space when said cutting blade is disposed in said retracted non-bag engaging position; and*

*wherein said two parallel closely spaced upstanding side walls facilitate holding up a bag material captured between said two opposing clamp members to allow the*

*cutting blade to more easily engage and penetrate said bag material as said cutting blade is pressed downwardly by said finger movable button through said blade guard, and further downwardly into said anvil protected bag cutting position.*

2. [A] *The bag* clamp [as in] *according to* claim 1, [where] *wherein* said *finger movable button is a* springboard button [is a piece of the upper clamp member, the piece] flexibly attached to [the remainder of the] *said* upper clamp member, the [piece] *springboard button* possessing an upper *surface* and a lower surface, said [piece] upper surface *of said springboard button* possessing concentric striations coincident with the upper surface of the upper clamp member.

3. [A] *The bag* clamp [as in] *according to* claim 2, where the cutting blade is attached fixedly to said springboard button lower surface and coincident with the lower surface of the upper clamp member.

4. [A] *The bag* clamp [as in] *according to* claim 3, [where] *wherein* said blade guard is made of rigid material, the blade guard possessing a longitudinal slit, where the cutting blade is positioned such that when the springboard button is pressed *flexibly downwardly toward said split anvil* by the user, the blade extends through the longitudinal slit.

5. [A] *The bag* clamp [as in] *according to* claim 4, where said blade guard is made of flexible material, said blade guard attached movably at one end and fixedly at the other to said upper clamp member inner surface.

*6. The bag clamp according to claim 1, further comprising:*

*a set of opposing stretching members disposed on respective individual ones of the clamp members for stretching a bag to be cut for helping to improve blade cutting efficiency as said cutting blade is moved into engagement with said bag; and*

*wherein said set of opposing stretching members include a plurality of internal ridges disposed on the inner surface of each one of said clamp members.*

*7. The bag clamp according to claim 6, wherein each one of said clamp members having an inner and an outer surface, and wherein, said set of opposing stretching members are disposed on the inner surface of respective ones of said clamp members for gripping the bag.*

*8. The bag clamp according to claim 7, wherein each individual set of stretching members includes a plurality of internal ridges disposed on the inner surface of respective ones of said clamp members.*

*9. The bag clamp according to claim 6, wherein said two opposing clamp members are hinged and biased together in said normally closed position by a spring located on one of said clamp members; and*

*wherein said opposing stretching members are further disposed on respective individual ones of the clamp members for helping to distribute the gripping force of said two opposing clamp member away from the location of said spring clip.*

*10. The bag clamp according to claim 1, wherein each one of said clamp members possessing a mouth end for engagement of a bag surface and a grasping end for grasping by a user.*

*11. The bag clamp according to claim 10, further comprising:*

*a hinge attached to the inner surface of each respective clamp member at a location between said mouth end and said grasping end; and*

*wherein said hinge is biased by a spring clip.*

*12. A bag clamp, comprising:*

*a pair of clamp members each having an inner surface and an outer surface;*

*securing means projecting upwardly from the inner surface of said pair of clamp members for spacing said pair of clamp members from one another along a rear portion thereon and for removably attaching said pair of clamp member to one another so they are biased together along a front portion thereof with a sufficient biasing force to clamp and hold a bag in a stationary position for closing and cutting purposes;*

*finger movable cutting means disposed in one of said pair of clamp members for biasing a cutting blade and a blade guard for rectilinear movement; and*

*bag raising stop means extending upwardly from the inner surface of one of said pair of opposing clamp members for holding a portion of said bag away from said inner surface and for limiting the path of travel of said blade guard as it and said cutting blade are pushed downward via a user pressing on said finger movable cutting means to facilitate bag cutting purposes.*

*13. The bag clamp according to claim 12, wherein said pair of clamp members includes an upper clamp member and a lower clamp member;*

*wherein said upper clamp member and said lower clamp member each have a cutting channel defined by a rib extending upward from the inner surface of the corresponding clamp member and a lip extending upward from a mouth portion of the corresponding clamp, said rib and said lip of the corresponding clamp members engaging one another for clamping said bag between them when said clamp members are biased to a normally closed position.*

*14. The bag clamp according to claim 13, wherein one of said clamp members has a box-like boss with a centrally disposed open sleeve extending outwardly therefrom along the inner surface of said one of said clamp members; and*

*said box-like boss further having an elongated slot disposed therein for helping to facilitate rotational movement between said pair of opposing clamp members.*

*15. The bag clamp according to claim 14, wherein another one of said clamp members has an elongated bar-like boss with another centrally disposed open sleeve extending outwardly therefrom along the inner surface of said another one of said clamp members; and*

*said bar-like boss being dimensioned to be received within said elongated slot for further helping to facilitate rotational movement between said pair of opposing clamp members.*

*16. The bag clamp according to claim 14, wherein said sleeve and said box-like boss project upwardly at different heights from the inner surface of one of said clamp members.*

*17. A bag clamp, comprising:*

*a pair of clamp members hinged together for relative movement between an open bag receiving position and a closed bag clamping position;*

*an upstanding split anvil integrally attached to an inner surface of an individual one of said pair of clamp members, said split anvil having two parallel sides between which a cutting blade is received;*

*a thin finger engagable button flexibly integrally attached to an outer surface of another individual one of said pair of clamp members, wherein the flexibility of said thin finger engagable button relative to the outer surface of said another individual one of said pair of*

*clamp members allows said button under the finger force of a user to move downwardly and upwardly relative to said outer surface between a guard protected position and an anvil protected position;*

*wherein said finger button has attached thereto at a distal end thereof a cutting blade and at a proximal end thereof a blade guard, said cutting blade and said blade guard being disposed adjacent an inner surface of said another individual one of said pair of clamp members when said finger button is disposed in said guard protected position;*

*said cutting blade being hidden and concealed behind and above said blade guard in a blade protected position when said finger button is disposed in said guard protected position; and*

*said cutting blade being hidden and concealed between said two parallel sides in another blade protected position when said finger button is disposed in said anvil protected position.*

*18. The bag clamp according to claim 17, wherein said blade guard is disposed below said blade for shielding said blade, said blade guard having a slot disposed therein for allowing said blade to pass therethrough when said blade guard comes into resting engagement with said split anvil allowing said blade to pass through said slot and through a bag into said cutting blade receiving area of said anvil.*

*19. The bag clamp according to claim 18, wherein said blade guard and said anvil cooperate to hold a portion of the bag up and away from an inner surface of said one of the clamp members to facilitate bag cutting purposes;*

*said slot and said slit being in longitudinal alignment when said pair of clamp members are disposed in said closed position with said blade guard resting against the bag for helping to hold the bag against said anvil to further facilitate bag cutting purposes.*

* * * * *